May 16, 1967 G. DOMMANN 3,319,777
CHAIN STRAND, ESPECIALLY FOR MINING CONVEYORS
Filed Oct. 20, 1965
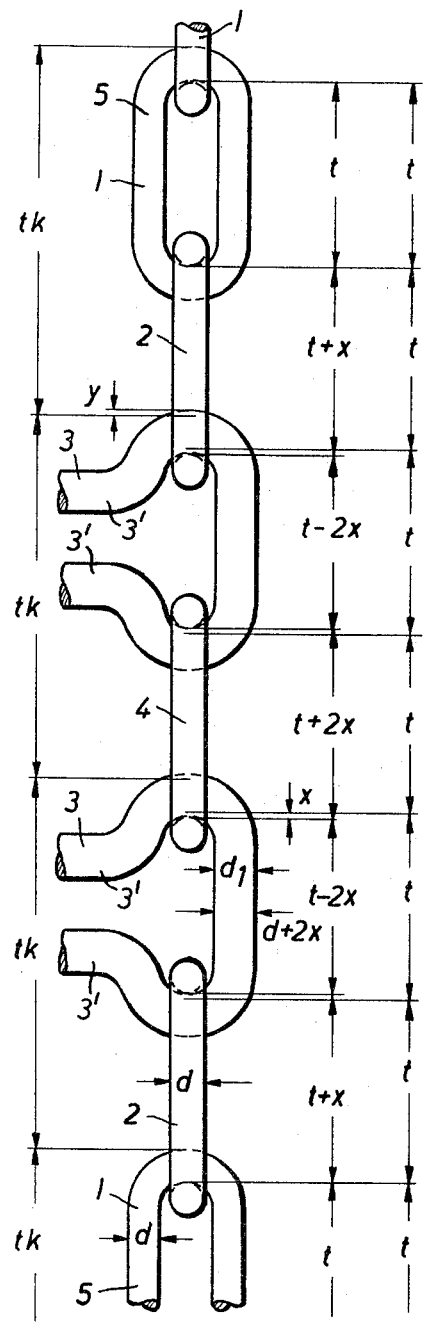
INVENTOR:
GÜNTHER DOMMANN
BY

United States Patent Office 3,319,777
Patented May 16, 1967

3,319,777
CHAIN STRAND, ESPECIALLY FOR MINING
CONVEYORS
Günther Dommann, Altlunen, Westphalia, Germany, assignor to Gewerkschaft Eisenhutte Westfalia, Wethmar, near Lunen, Westphalia, Germany, a corporation of Germany
Filed Oct. 20, 1965, Ser. No. 498,955
Claims priority, application Germany, Oct. 31, 1964,
G 41,912
13 Claims. (Cl. 198—168)

The present invention relates to a chain strand, especially for mining conveyors, such as those using a single chain carrying scraper bars or flights thereon at spaced intervals therealong, with the chain strand being mounted on chain driving drums at the ends of the mining conveyor for conducting the chain or chains in an upper forward direction and a lower return direction between such drums, whereby the upper chain portion will be disposed with respect to the conveyor surface in a manner permitting the scraper bars or flights to guide along the conveyor surface material disposed thereon for conveyance thereby. More particularly, the present invention relates to such a chain strand for a mining conveyor, especially of the single chain scraper conveyor type, with bolt chain links being provided in the chain strand for carrying scraper bars or flights thereon and with such bolt chain links having on all sides a greater cross sectional thickness than the remaining normal chain links in the chain strand.

U.S. Patent 2,745,651 illustrates a mining arrangement having a double chain scraper conveyor with scraper bars or flights spaced therealong for conveying mineral disposed upon the mining conveyor surface from the site of mining operations. This type of mining conveyor is well known and analogously the use of a single chain scraper conveyor is also known, the latter differing from the double chain scraper conveyor by the omission of a second chain whereby the scraper bars or flights attached to the single chain may move in the desired manner such that their free ends may change in spaced relation from one another. This is advantageous where the mining conveyor contains curves deviating from the normal longitudinal path, whereby the single chain may be displaced about such curves and the scraper bars or flights thus be moved with respect to one another from a transverse parallel spaced apart relationship to a radial relationship. Suitable guide means, of course, are provided along the course of the scraper bar drive chain and guide means may even be provided to maintain the free ends of such bars or flights in the desired horizontal relationship along the conveyor surface. Generally, at each end of the conveyor path, whether such path is straight or contains curves, a suitable chain driving drum is positioned over which the chain strand, i.e., an endless chain, is looped such that the forward portion of the chain strand is disposed above the conveyor surface whereas the return portion of such chain strand is disposed below the conveyor surface.

Chain bolt links, especially when used for mining conveyors having a single conveying chain, are generally made heavier than normal chain links. This is due not only to the necessity for imparting special wear resistance to the chain bolt links which carry the scraper bars or flights, but also due to the fact that such chain bolt links usually are provided in the form of an open link having a pair of lateral limbs which are fastened to the particular scraper bar or flight, commonly designated a scraper iron. Considering that there is an inherent weakening of the chain bolt link caused by the presence of an attachment opening therein, it is necessary to compensate for such opening at least by increasing the cross-section on all sides of the chain bolt link.

Since the chain bolt links must pass over the pockets or other chain link engaging means in the chain driving drum, in the same manner as the normal chain links in the chain strand, it is only possible to increase the thickness of the chain bolt links within very narrow limits. These limits are determined by the tolerances permitted by the particular shape of the chain drum pockets or chain link engaging means, yet the formfitting engagement of all horizontal or vertical chain links, as the case may be, must be assured as they pass over the chain drum. Naturally, the chain driving drum contains the chain pockets or other chain engaging means thereon at predetermined spaced intervals therearound so as to accommodate the chain links thereon with a given tolerance determined by the dimensions of the normal chain links in the chain strand usable with such drum.

The increase in thickness of the chain bolt links, so long as it does not exceed these tolerances, is generally sufficient for attaining the necessary strength to compensate for the opening in the chain bolt links and to compensate for the greater wear to which such chain bolt links are subjected because of the added weight of the scraper bars or scraper irons which must be carried thereby. Since the pitch length or inside longitudinal distance of the chain bolt link changes with a strengthening achieved by an increase in cross-sectional thickness, the difference in pitch length or pitch distance is transferred necessarily to the next link in the chain. Such change in pitch distance does not produce any adverse effect in the chain operation, especially with respect to accommodation on the chain driving drum, as long as only one of the chain links simultaneously in engagement with the chain drum differs with the standard pitch distance or normal pitch distance of the remaining chain links in engagement with the drum, provided that the tolerances which the chain driving drum can take are not exceeded.

If, however, two chain bolt links of increased cross-sectional thickness are disposed next to one another in the chain strand with only one link between them, as in the case for example of a single chain strand scraper conveyor or curved conveyor, such that a given scraper bar or scraper iron is attached to both such chain bolt links to provide the scraper bar with better guidance along its path of travel, both of such chain bolt links as well as the link that interconnects them will be simultaneously in engagement with the chain driving drum for a short time as they pass over the drum. This necessarily results in objectionable jamming of the chain.

It is an object of the present invention to overcome the foregoing drawbacks and to provide a chain strand, especially of the type used in connection with a single chain scraper conveyor, containing chain bolt links with means for attachment to appropriate scraper bars or scraper irons, with the chain bolt links being increased in cross-sectional thickness in an amount exceeding the normal tolerance of the chain driving drum, with suitable compensation in the adjacent chain link so as to avoid jamming of the chain strand on the chain driving drum even though the cross-sectional thickness of the chain bolt links is increased beyond the normal tolerance which the drum can accept.

Another object of the invention is to provide an improvement in a chain strand adapted to be conducted along a path of travel in driving engagement along a portion thereof with a chain driving drum and containing chain bolt links adapted to carry elements such as scraper bars or scraper irons thereon, with at least one of such chain bolt links having an increase in diameter beyond the normal tolerance which the drum can accept and with the adjacent link thereto being provided with an increased length measured by the excess of the pertinent chain bolt link dimensions which exceed the drum tolerance.

It is another object of the present invention to provide a chain strand of the foregoing type which is simple to manufacture, durable in use, and adaptable to accommodation on a given chain driving drum with power transmitting contact between such drum and all of the link units of the chain strand as such units pass over the drum, yet without jamming of the drum although the chain bolt links included in the chain strand possess an increase in diameter over the normal chain diameter, which increase in diameter exceeds the tolerance permitted by the chain driving drum.

Other and further objects of the invention will become apparent from a study of the within specification and accompanying drawing, in which:

The figure shown illustrates an embodiment of the invention in which is schematically indicated a portion of a chain strand having chain links of normal size as well as chain links of increased diameter and compensating links adjacent the chain bolt links with appropriate dimensions sufficient to offset the changes in diameter of the chain bolt links whereby the chain strand may be accommodated on an appropriate chain driving drum without jamming.

It has been found in accordance with the present invention that an improvement may now be provided in a chain strand having a plurality of interconnecting links adapted to be conducted along a path of travel by driving engagement with a chain driving drum having chain receiver pockets or other chain link engaging means thereon at predetermined spaced apart intervals therearound for accommodating the chain links thereon within a given tolerance, such improvement comprising a chain strand having a plurality of first normal links with a normal diameter and a normal pitch distance, i.e., normal inside longitudinal length, for normal driving engagement with such a drum within such a given tolerance, the plurality of first links being interrupted by a set of anormal links including in tandem a second link and a third link, the third link being a carrier link, i.e. a chain bolt link, having an increase in diameter and a resulting decrease in pitch distance, i.e., changed inside longitudinal length, as compared with the normal diameter and normal pitch distance, as well as having means for attaching an element to be carried thereby, such as a scraper bar or scraper flight or scraper iron, along such path of travel, and said second link having such normal diameter and an increase in pitch distance, i.e., a changed inside longitudinal length, as compared with the normal pitch distance substantially ranging between the increase in diameter of said third link and said increase in diameter less the given tolerance of the drum. Preferably, the increase in pitch distance of the second link is equal to the increase in diameter of the third link less the tolerance.

In accordance with a specific preferred embodiment of the invention, a further third link corresponding with the first mentioned third link is positioned in the chain strand for simultaneous engagement with the chain driving drum along with the first mentioned third link, the links between said third links having an additive increase in pitch distance as compared with said normal pitch distance substantially ranging between twice such increase in diameter of the third link and twice such increase in diameter less the tolerance. Advantageously, only one link is positioned between the two third links, said only one link being a fourth link having said normal diameter and an increase in pitch distance as compared with the normal pitch distance ranging between twice such increase in diameter of the third link and twice such increase in diameter less the given tolerance of the drum. Furthermore, in accordance with a specific embodiment of the invention, the increase in pitch distance of the second link is equal to the increase in diameter of the third link less said tolerance, whereas the increase in pitch distance of the fourth link is equal to twice the increase in diameter of the third link less said tolerance.

Referring to the drawing, a portion of a chain strand 5 is shown of the type adapted to be conducted along a path of travel in engagement with a chain driving drum having chain pockets or other chain link engagement means thereon at predetermined spaced apart intervals therearound for accommodating the chain links of the strand within a given tolerance $y$, such chain strand including a plurality of horizontal and vertical normal links 1 interrupted by a set of anormal links 2, 3, 4, the chain strand prferably being an endless chain strand. Thus, the chain strand may be mounted on a pair of spaced apart chain driving drums with an upper forward chain portion and a lower return chain portion, such that the upper chain portion which is adapted to carry scraper bars or scraper flights or scraper irons laterally thereof may pass along the surface of a conveyor means, such as a single chain mining conveyor, for conducting material on such conveyor surface in a predetermined direction. Such a conveyor in which the single chain strand of the invention may be used may contain curves therein which will be suitably accommodated by the chain strand and the scrapper bars or the like thereon, due to the fact that the free ends of the scrapper bars may be displaced from a parallel spaced apart relationship transverse the longitudinal axis of the chain strand to a radial relationship resulting from the particular curvature encountered. Such single chain scraper conveyors are conventional, and these include conventional chain bolt links which are open at one lateral side in order to provide means for attachment with the appropriate scraper bars thereat without interferring with the normal disposition of the chain, as would be the case where the attachment means for the scraper bar or the like to be provided along the normal shank of a chain link, whereby the inside space of the chain link would be undesirably occupied to the hindrance of free movement of the connections between the links. The links 1 have a normal diameter $d$ and a normal pitch distance $t$, i.e., the inside longitudinal length of the link. The links 3, on the other hand, are carrier links or chain bolt links having an opening at one lateral side thereof at which the portions 3' are disposed to provide means for attaching an element, such as scraper bar or the like, to be carried thereby along the path of travel of chain strand 5. The links 3 have an increased diameter $d+2x$ or $d_1$ and a resulting decreased pitch distance $t-2x$, as compared with the normal diameter $d$ and the normal pitch distance $t$ of the normal chain links 1, whereby increased wear resistance and strength are attained in view of the fact that the chain bolt links 3 are open at one lateral side and are designed to carry the extra weight of an element, such as a scraper bar, thereat. The links 2 have a normal diameter $d$, yet such links 2 are provided with an increased pitch distance $t+x$ as compared with the normal pitch distance $t$ of normal links 1, such increase in pitch distance substantially ranging between the increase in diameter of the appropriate link 3, i.e., $x$, and such increase in diameter less the given tolerance of the chain drum in question, i.e., $x-y$. On the other hand, the link 4 is provided with an increased pitch distance $t+2x$ as compared with the normal pitch distance $t$ of normal links 1, such increase in pitch distance substantially ranging between twice the increase in diameter of the appropriate link 3, i.e., $2x$, and such increase in diameter less the given tolerance of the chain drum, i.e. $2x-y$. The diameter of the chain link 4, like the diameter of the links 2, is equal to the normal diameter $d$ of the normal links 1.

The over-all chain drum pitch is designated as $tk$ which represents the repeated units of chain links accommodated on the drum with respect to the tolerance $y$, and such chain drum pitch $tk$ in the instance given corresponds to twice the normal pitch distance $t$. Thus, in order to accommodate the links 3 of increased diameter, the adjacent links 2 and 4 must be increased in their pitch distance appropriately to realign the link units passing over the dum, including links 3, to fit within the chain pitch dimension $tk$ considering the tolerance $y$ of the drum. While the links 2 are increased in pitch distance by an amount equal to the increase in diameter of the appropriate link 3, because the link 4 interconnects a pair of increase diameter links 3, the pitch of such link 4 must be increased to the extent of twice the diameter increase of a link 3 to achieve in toto an adjustment for the separate diameter increases of both of the links 3 interconnected by such link 4. Accordingly, while the chain pitch $tk$ of the drum in question is twice the normal pitch $t$, due to the fact that a pair of links is accommodated on the drum with consideration being given to the tolerance $y$, to adjust for the increase in diameter $x$ of the links 3 in the chain strand 5, the links 2 must be assigned a pitch distance of $t+x$ and the link 4 must be assigned a pitch distance of $t+2x$ whereas the links 3 possess a pitch distance of $t-2x$.

All in all, because of the appropriate increase in the pitch distance of links 2 and 4 as the case may be, the change in diameter, pitch distance and over-all chain length of the links 3 will be suitably accommodated within the chain strand and among the chain strand units corresponding with the pitch $tk$ of the drum, in consideration of the tolerance $y$, so that jamming of the chain strand on the drum will not occur, but instead the various chain links will be received with full power transmitting contact between the drum and all of the link units of the chain strand, using to the maximum extent possible the tolerance $y$ of the drum. Nevertheless, in connection with the foregoing embodiment and all embodiments falling within the chain concept of the present invention, the increase in pitch distance of the links 2 may range between the increase in diameter of the appropriate link 3 and such increase in diameter less the tolerance of the drum while the link 4 may range in pitch distance between twice the increase in diameter of a given link 3 and twice such increase in diameter less the appropriate tolerance $y$. The dimension $y$ is aforesaid may not exceed the tolerances which can be handled by the chain pitch $tk$ on the drum. Therefore, the chain strand shown can readily engage the chain drum without using up the tolerances $y$ allowed by the chain drum pockets or other chain engaging means of the drum.

In accordance with further features of the present invention, of course, the chain strand 5 may include besides a plurality of links 1, a set of anormal links, interrupting links 1, wherein the anormal links include in tandem a link 2, a link 3, and a further link 2 of the type noted without also including a link 4 or the further link 3 shown. This is of benefit where a single chain link bolt 3 is utilized for attaching an appropriate scraper bar or other element rather than a pair of such links 3 together forming an attachment for the single scraper bar situated thereat. Furthermore, various combinations of links 2, 3 and/or 4 may be utilized to interrupt in tandem a plurality of chain links 1 forming a chain strand 5, such as in tandem links $-1-2-3-1$, $-1-2-3-4-4-3-2-1-$, and $-1-2-3-4-3-1-$, keeping in mind that the pitch distances of the links, including the increased diameter links 3 with the links 1 or with one another, must be such as to accommodate for the increase in diameter of the links 3, considering the tolerance $y$ of the drum which cannot be exceeded.

Thus, in accordance with further embodiments of the present invention, an improvement in a chain strand of the foregoing type may be provided which comprises such chain strand having in addition to a plurality or first normal links with a normal diameter and a normal pitch distance for normal driving engagement with a drum of the instant type within such a given tolerance, an interrupting set of anormal links including in tandem a second link, a third link, and a further second link, said third link being a carrier link having an increase in diameter and a resulting decrease in pitch distance as compared with said normal diameter and normal pitch distance as well as having means for attaching an element to be carried thereby along such path of travel, and said second links each having said normal diameter and an increase in pitch distance as compared with said normal pitch distance substantially equal to the increase in diameter of said third link. Preferably, the increase in pitch distance of the second links is diminished by an amount corresponding to the tolerance of the drum.

In accordance with a particular modification, the set of anormal links may include in tandem said second link, said third link, a fourth link, a further third link corresponding to said first-mentioned third link, and said further second link, with said fourth link having said normal diameter and an increase in pitch distance as compared with said normal pitch distance substantially equal to twice the increase in diameter of said third link. In this instance it is also preferred that the increase in pitch distance of each of the second links is diminished by an amount corresponding to the drum tolerance and that the increase in pitch distance of the fourth link is also diminished by an amount corresponding to such tolerance.

In connection with a still further embodiment of the invention, an improvement may be provided which comprises such chain link strand having a plurality of first normal links with a normal diameter, a normal outside length, and a normal pitch distance for normal driving engagement with such a drum within such a given tolerance, said plurality of first links being interrupted by a set of anormal links including in tandem a second link, a third link and a further second link, said third link being a carrier link having an increase in diameter as compared with said normal diameter, a decrease in pitch distance as compared with said normal pitch distance and an increase in outside length as compared with said normal outside length as well as means for attaching an element to be carried thereby along such path of travel, said increase in outside length being at most equal to the corresponding given tolerance of such chain drum and said decrease in pitch distance being equal to twice the remainder of such diameter increase in excess of such increase in outside length, and said second links each having said normal diameter and an increase in pitch distance as compared with said normal pitch distance substantially equal to the difference between the increase in outside length and increase in diameter of said third link minus said tolerance. In connection with thus further modification, the set of anormal links may include preferably in tandem not only said second links and said third links, but a fourth link and a further third link such that the links are arranged in tandem as said second link, said third link, such fourth link, such further third link corresponding to the first-mentioned third link and said further second link, with the fourth link having said normal diameter and increase in pitch distance as compared with the normal pitch distance substantially equal to twice the difference between the increase in outside length and increase in diameter of one of such third links minus said tolerance.

It will be appreciated that the instant specification and drawing are set forth by way of illustration and not limitation, and that various modifications and changes may be made without departing from the spirit and scope of the present invention which is to be limited only by the scope of the appended claims.

What is claimed is:

1. In a chain strand having a plurality of interconnecting links adapted to be conducted along a path of travel by driving engagement with a chain driving drum having chain link engaging means thereon at predetermined spaced intervals therearound for accommodating the chain links thereon within a given tolerance, the improvement which comprises such chain strand having a plurality of first normal links with a normal diameter and a normal pitch distance for normal driving engagement with such a drum within such a given tolerance, said plurality of first links being interrupted by a set of anormal links including in tandem a second link and a third link, said third link being a carrier link having an increase in diameter and a resulting decrease in pitch distance as compared with said normal diameter and normal pitch distance as well as having means for attaching an element to be carried thereby along such path of travel, and said second link having said normal diameter and an increase in pitch distance as compared with said normal pitch distance substantially ranging between the increase in diameter of said third link and said increase in diameter less said tolerance.

2. Improvement according to claim 1 wherein said increase in pitch distance of said second link is equal to the increase in diameter of said third link less said tolerance.

3. Improvement according to claim 1 wherein a further third link corresponding to said first-mentioned third link is positioned in such chain strand for simultaneous engagement with said driving drum along with said first-mentioned third link, the links between said third links having an additive increase in pitch distance as compared with said normal pitch distance substantially ranging between twice such increase in diameter of said third link and twice said increase in diameter less said tolerance.

4. Improvement according to claim 3 wherein only one link is positioned between said third links, said only one link being a fourth link having said normal diameter and an increase in pitch distance as compared with said normal pitch distance ranging between twice such increase in diameter of said third link and twice said increase in diameter less said tolerance.

5. Improvement according to claim 4 wherein said increase in pitch distance of said second link is equal to the increase in diameter of said third link less said tolerance and said increase in pitch distance of said fourth link is equal to twice the increase in diameter of said third link less said tolerance.

6. In a chain strand having a plurality of interconnecting links adapted to be conducted along a path of travel by driving engagement with a chain driving drum having chain link engaging means thereon at predetermined spaced intervals therearound for accommodating the chain links thereon within a given tolerance, the improvement which comprises such chain strand having a plurality of first normal links with a normal diameter and a normal pitch distance for normal driving engagement with such a drum within such a given tolerance, said plurality of first links being interrupted by a set of anormal links including in tandem a second link, a third link, and a further second link, said third link being a carrier link having an increase in diameter and a resulting decrease in pitch distance as compared with said normal diameter and normal pitch distance as well as having means for attaching an element to be carried thereby along such path of travel, and said second links each having said normal diameter and an increase in pitch distance as compared with said normal pitch distance substantially equal to the increase in diameter of said third link.

7. Improvement according to claim 6 wherein said increase in pitch distance of said second links is diminished by an amount corresponding to such tolerance of such chain driving drum.

8. Improvement according to claim 6 wherein said set of anormal links includes in tandem said second link, said third link, a fourth link, a further third link corresponding to said first-mentioned third link, and said further second link, with said fourth link having said normal diameter and an increase in pitch distance as compared with said normal pitch distance substantially equal to twice the increase in diameter of said third link.

9. Improvement according to claim 8 wherein said increase in pitch distance of each of said second links is diminished by an amount corresponding to such tolerance of such chain driving drum and wherein said increase in pitch distance of said fourth link is also diminished by an amount corresponding to such tolerance.

10. Improvement according to claim 9 wherein said third links are open-ended at one corresponding lateral side thereof and said means for attaching an element are located at the open ends of such third links.

11. In a chain strand having a plurality of interconnecting links adapted to be conducted along a path of travel by driving engagement with a chain driving drum having chain link engaging means thereon at predetermined spaced chain pitch intervals therearound for accommodating the chain links thereon within a given chain pitch tolerance, the improvement which comprises such chain strand having a plurality of first normal links with a normal diameter, a normal outside length, and a normal pitch distance for normal driving engagement with such a drum within such a given tolerance, said plurality of first links being interrupted by a set of anormal links including in tandem a second link, a third link and a further second link, said third link being a carrier link having an increase in diameter as compared with said normal diameter, a decrease in pitch distance as compared with said normal pitch distance and an increase in outside length as compared with said normal outside length as well as means for attaching an element to be carried thereby along such path of travel, said increase in outside length being at most equal to the corresponding given tolerance of such chain drum and said decrease in pitch distance being equal to twice the remainder of such diameter increase in excess of such increase in outside length, and said second links each having said normal diameter and an increase in pitch distance as compared with said normal pitch distance substantially equal to the difference between the increase in outside length and increase in diameter of said third link minus said tolerance.

12. Improvement according to claim 11 wherein said set of anormal links includes in tandem said second link, said third link, a fourth link, a further third link corresponding to said first-mentioned third link, and said further second link, with said fourth link having said normal diameter and an increase in pitch distance as compared with said normal pitch distance substantially equal to twice the difference between the increase in outside length and increase in diameter of one of said third links minus said tolerance.

13. Improvement according to claim 12 wherein said third links are open-ended at one corresponding lateral side thereof and said means for attaching an element are located at the open ends of such third links.

References Cited by the Examiner

German printed application No. 1,158,000, November 1963.

EVON C. BLUNK, *Primary Examiner.*

R. J. HICKEY, *Assistant Examiner.*